Patented Sept. 2, 1924.

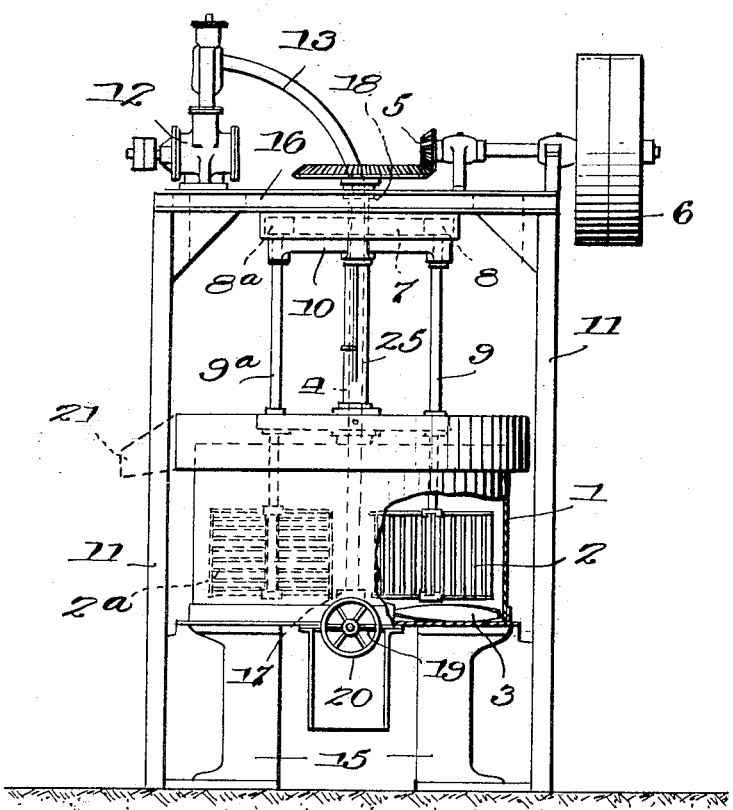

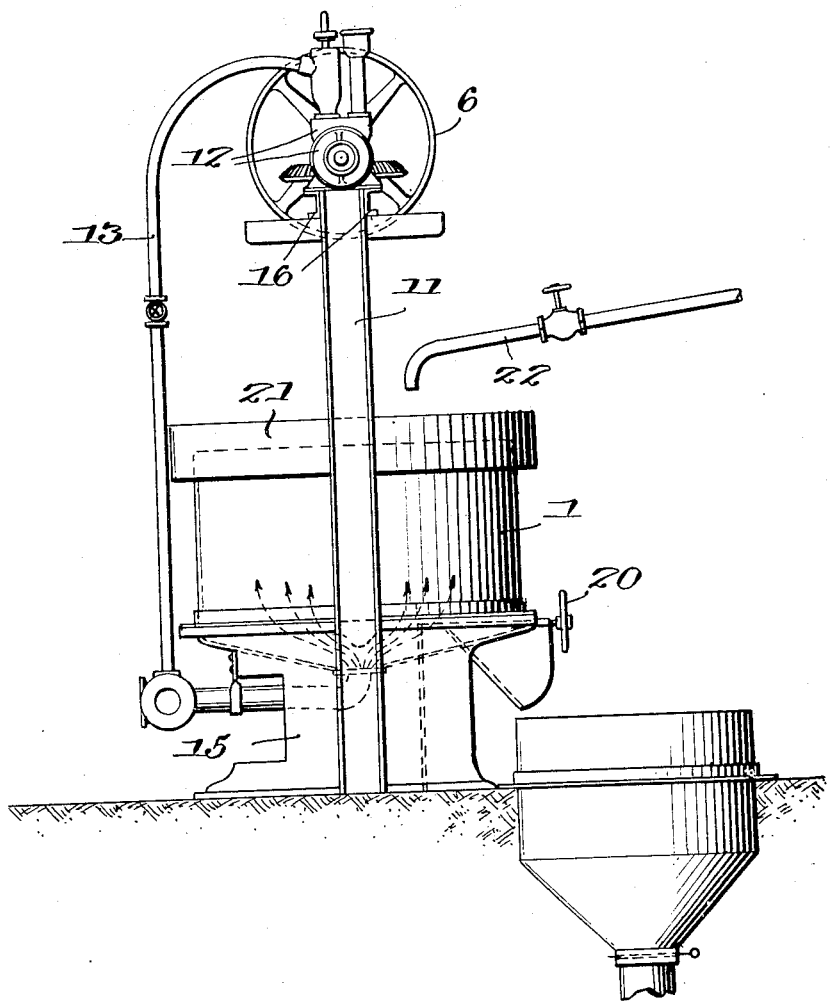

1,506,831

UNITED STATES PATENT OFFICE.

PAUL GROSS, OF CHARLOTTENBURG, NEAR BERLIN, GERMANY, ASSIGNOR OF ONE-FIFTH TO PEASLEE, BRIGHAM AND GENNERT, OF NEW YORK, N. Y.

PROCESS FOR THE MANUFACTURE OF WHOLE-GRAIN BREAD.

Original application filed August 3, 1922, Serial No. 579,525. Divided and this application filed January 25, 1924. Serial No. 688,538.

*To all whom it may concern:*

Be it known that I, PAUL GROSS, a citizen of the Republic of Germany, residing at Charlottenburg, near Berlin, Germany, have invented certain new and useful Improvements in Processes for the Manufacture of Whole-Grain Bread, of which the following is a specification.

This invention relates broadly to the manufacture of whole grain bread, such as whole wheat bread or other bread made from the entire edible part of the grain, according to the wet process described in my Letters Patent of the United States No. 1,213,627, wherein whole grain dough is formed directly from a mass of wet grain, as contrasted to prior processes using dry milled flour.

The particular improvements of this present invention relate specifically to a process for eliminating the husks from the mass of grain. This application was divided from my apparatus application, Serial No. 579,525, filed August 3, 1922, which includes claims to apparatus used for conducting the process of Patent 1,213,627.

The process of making bread or other food products includes the separation of the husks from the grain by first thoroughly washing the grain by means of water while stirring the same within a suitable vessel, thereafter soaking the grain with water at elevated temperature, preferably at a temperature of 60 to 65° C., while stirring and beating the same for gradually separating therefrom the husks, removing the separated husks from the mass of grain, disintegrating the grain separated from the husks, and working the grain into food products.

I have found that by thus treating the grain I am enabled to remove therefrom the undigestible matter and more particularly the husks mainly consisting of cellulose, while the digestible parts and more particularly those containing the carbohydrates (starch) and the albumen (gluten) enter almost without loss into the food product. The dough thus obtained can be cooked into bread or into food preserves and more particularly food products which are in a dry state and which therefore can be stored for any length of time without losing their good taste and digestibility. Dry food preserves thus made from the mass obtained by the aforesaid process are particularly suitable for use in hospitals, for tourists' use and the like, by reason of their high nourishing property.

The apparatus described in application Serial No. 579,525 is preferably used for carrying out the present process. In this apparatus the husks are speedily separated from the grain, and air is blown upwardly through the wet mass of grain to carry the husks to the top of the mass from which location the husks are carried away by an excess of water.

The process is conducted in the apparatus illustrated in the accompanying drawings. Like reference characters identify like parts in the various figures.

In the drawings:

Figure 1 is an elevation of the apparatus partly in section;

Figure 2 is an elevation seen from the left in Figure 1, and

Figure 3 is a plan view thereof.

As shown the apparatus consists of a vessel or trough 1 mounted on pillars 15 and a frame consisting of uprights 11 and transverse beams 16. Centrally of the trough a vertical shaft 4 is mounted in bearings 17 and 18 disposed one at the bottom of the trough and the other one on the transverse beams 16 and adapted to be rotated from a belt pulley 6 through the intermediary of bevel gear wheels 5. To the bottom end of the shaft 4 and to be rotated therewith and thereby, a stirring member 3 is keyed which sweeps on the bottom of the trough and close to the circumference thereof, and which, by reason of the helical form of its blades has the function to throw the grains from the bottom of the trough upwardly into the path of the beating members 2 and 2ª. On the shaft 4 and rotatably mounted independently thereof is a frame which consists of a tubular member 25 and upper and lower transverse members 10 providing guides for shafts 9 and 9ª extending downward into the trough and carrying at their lower ends beating members 2 and 2ª. As shown only two beating members are provided. But I wish it to be understood that I do not limit myself to this number of beating members. To the top ends of the shafts 9 and 9a pinions 8 and 8a are keyed which are in mesh with a large gear wheel 7 keyed to the shaft 4.

Preferably the beating members comprise each four wings or blades in a form similar to grates, and the bars of consecutive grates are staggered with relation to each other by being disposed at an angle to each other, the bars of one grate being vertical and the next one horizontal. The paths of movement of the grate bars thus intersect, and give a maximum efficiency in the stirring movement.

On the beams 16 a blower 12 is mounted, which communicates through a pipe 13 with the bottom part of the trough 1 for forcing air under pressure through the same to remove the husk from the mass and collect it at the top thereof.

The trough is formed with a bottom discharge 19, the slide valve of which is controlled by a hand wheel 20, and with a discharge 21 at its top for the water used for washing the grain, and any excess of water used for soaking the same together with the husks, which water may be further treated for regenerating the starch contained therein, as is known in the art. Through the bottom discharge the grain treated within the trough is supplied to further apparatus for treating the grain. 22 is a supply for cold or hot water required for washing and soaking the grain.

The operation of the apparatus is as follows:

The trough 1 is first charged with the grain to be treated, and cold water is supplied through the pipe 22 for washing. Now the shaft 4 is rotated for operating the stirring member 3. The rotary movement is transmitted through the gear 7 and the planet gears 8 and 8a to the shafts 9 and 9a and the beating members 2 and 2a, which are thereby set into rotation. However, by reason of the resistance to the rotation of the beating members within the mass of water and grain, the system of beating members and the supporting frame with its parts 25 and 10 are set in motion around the shaft 4 under the driving action of the gear 7, so that the beaters 2 and 2a are gradually moved through the whole trough 1. The grain gets in thorough contact with the bars of the beaters, so that any impurities adhering thereto are removed, while the husks are not yet separated. The impurities are removed from the trough through the top discharge by continuously supplying fresh water through the pipe 22. After thus cleaning the grain warm water at a temperature of 60° to 65° C. is supplied, and the velocity of the system is increased. Thus the husks are softened and separated by the beaters, and in addition the breaking of the albumen bearing skin of the grain is started by the action of the beaters. Thereafter the system is stopped. At this point the particular features of the present invention begin. Air under pressure is forced into the trough from the bottom upwardly, so that the separated husks rise to the surface of the mass, from which they are discharged by a fresh supply of water through the top discharge 21. Finally the grain is removed and passes through crushing rollers, as is known in the art. Thereafter the matter is directly worked into dough for making bread, or it is dried and otherwise treated for making therefrom dry food preserves, such as flakes or flour, which can be stored for any length of time, and which by reason of their high nutritious property and digestibility are suitable for various purposes.

From the foregoing description it will be understood that within a trough of high capacity beaters of small diameters are provided which require a minimum of power. The beaters are moved through the whole trough, so that thorough action on the whole mass of grain is insured. By providing a plurality of beaters the water and the grain are set into violent motion, which likewise insures thorough action. Accordingly, experience has shown that the time required for washing and removing the husk from the grain is materially reduced as compared to the methods now in use using a single beater.

The driving mechanism is simple in construction, the same belt gearing and bevel gears 5 being used for operating both the stirring member 3 and all the beating members 2 and 2a. The said members are readily accessible from above for cleaning the same. By mounting the members on vertical shafts and providing beating members having apart from their rotary movement a progressive movement, a trough of great capacity can be provided.

While in describing the invention for the subsequent removal of the husk, reference has been made to a particular apparatus, I wish it to be understood that my invention is not limited to use in the construction shown in the drawings, and that various changes may be made in the general arrangement of the apparatus and the construction of its parts within the scope of my invention on the process.

I claim:

1. The process of treating grain to prepare it for food stuffs, which process comprises subjecting grain in a trough to a combined agitating and washing treatment to remove the husk from the grain, thus forming a dough mass including mashed grain and husk, stopping the agitating treatment, and moving the husk particles from the mass to the upper part thereof by forcing air upwardly through the mass.

2. The process of treating grain to prepare it for food stuffs, which process comprises subjecting grain in a trough to a combined agitating and washing treatment to remove the husk from the grain, thus forming a dough mass including mashed grain and husk, and moving the husk particles from throughout the mass to the upper part thereof by forcing a gaseous medium upwardly through the mass.

3. The process of treating grain to prepare it for food stuffs, which process comprises subjecting grain in a trough to a combined agitating and washing treatment to remove the husk from the grain, thus forming a dough mass including mashed grain and husk, stopping the agitating treatment, moving the husk particles from the mass to the upper part thereof by forcing air upwardly through the mass, and removing the husk, thus collected at the top, by flowing it off with added water.

In testimony whereof I affix my signature

PAUL GROSS.